No. 783,296. PATENTED FEB. 21, 1905.
W. J. MILES, Jr.
BLADE FOR AGRICULTURAL IMPLEMENTS.
APPLICATION FILED SEPT. 27, 1902.
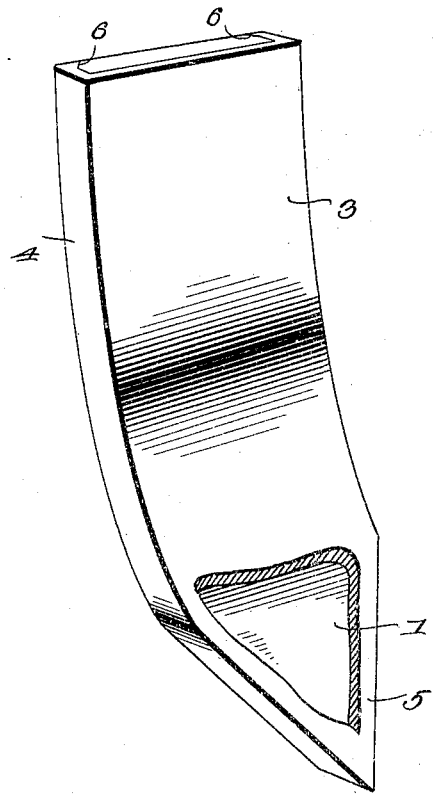
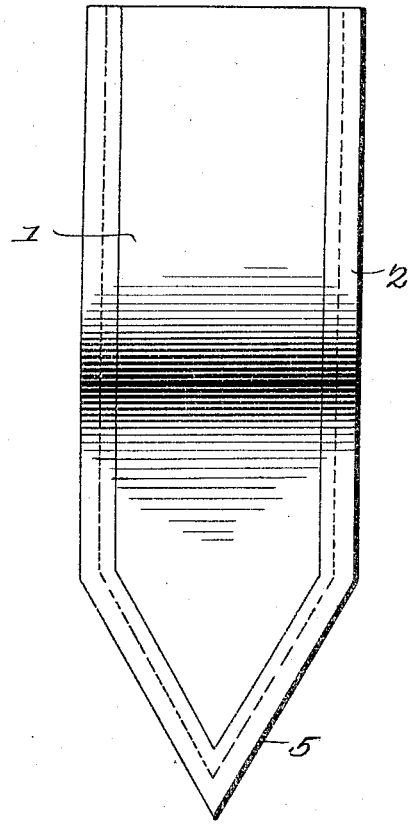
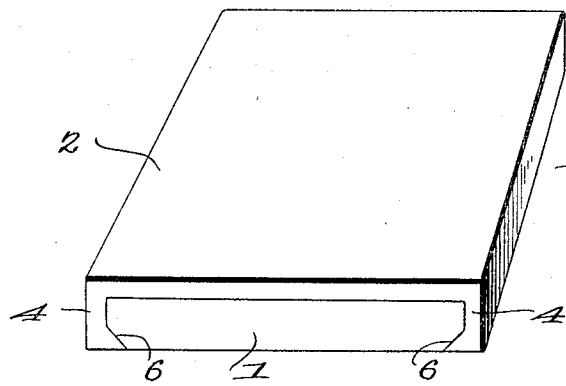
Witnesses:
E. F. Stewart
R. M. Elliott.
William J. Miles, Jr.,
Inventor,
by C. A. Snow & Co.
Attorneys.

No. 783,296. Patented February 21, 1905.

UNITED STATES PATENT OFFICE.

WILLIAM J. MILES, JR., OF MIDDLETOWN, OHIO.

BLADE FOR AGRICULTURAL IMPLEMENTS.

SPECIFICATION forming part of Letters Patent No. 783,296, dated February 21, 1905.

Application filed September 27, 1902. Serial No. 125,116.

*To all whom it may concern:*

Be it known that I, WILLIAM J. MILES, Jr., a citizen of the United States, residing at Middletown, in the county of Butler and State of Ohio, have invented a new and useful Blade for Agricultural Implements, of which the following is a specification.

This invention relates to the manufacture of blades for agricultural implements, under which generic term may be included cultivator-shovels, plowshares, moldboards, and other parts of agricultural implements presenting a cutting edge to the earth.

The object of the invention is without materially adding to the cost of production of such structures to increase to a great extent their wearing qualities, to reduce danger of springing or buckling when being tempered to a minimum, and practically to obviate breakage in use.

The present invention consists in the manufacture of blades for agricultural implements in which the face and edges and a small portion of the back are formed of hardened steel which is integral with a core of untempered metal, such as wrought-iron, whereby the edges of the blade will be given the same wear-resisting qualities as the face and blades will be produced in which the edge retains its sharpness even after a considerable amount of wear has taken place.

The construction of cultivator-shovels, plowshares, and the like of several laminæ of different degrees of hardness is, broadly considered, old, and it is also old to manufacture blades for agricultural implements with hardened faces and soft backs, formed integral by chilling the face of the blade and then annealing it without softening the chilled face. Both of these types of blades are useful in reducing the liability of breakage; but neither is effective in diminishing the wear at the edge of the blade, which is the principal object of the present invention.

In the accompanying drawings, forming part of this specification, in which like characters of reference indicate corresponding parts, there is illustrated a form of blank for the construction of blades of the character contemplated in this invention, and there is also shown a cultivator-shovel constructed from a blank of one of the forms illustrated.

In the drawings, Figure 1 is a view in perspective, partly in section, of a blade for agricultural implements constructed in accordance with the present invention, the view being taken from the front. Fig. 2 is a view of an elevation, taken from the rear of the blade. Fig. 3 is a perspective detail view of the blank or ingot from which the blade is formed.

Referring to the drawings, 1 designates the core, which is relatively broad and may be made of wrought-iron or soft untempered steel. On the outside of the core 1 and fixed thereon or suitably attached thereto by welding or otherwise is a sheath or envelop 2 of a high-grade carbon-steel. As shown in Figs. 1 and 2, the face 3 and sides or edges 4, the lower end or point 5, and a portion of the rear of the core contiguous to its edges are covered by the envelop, the upper end of the core being exposed and the back practically so. As shown on Figs. 1 and 3, the corners of the rear side of the core are beveled, as at 6, and the sheath is extended over these beveled portions to form a more secure union between the envelop and the core and also to prevent wear of its corners at the back. In Fig. 3 there is shown a blank or ingot from which the blade or other part of an agricultural implement may be made, this being effected by rolling, stamping, forging, or otherwise to bring it to the desired shape.

When a cultivator-shovel or other blade for agricultural implements is constructed from a blank, as shown, the face, edges, point, and a portion of the back of the core will be fully protected by the hard-steel shield and the core will give sufficient toughness to the blade to prevent breakage when brought into forcible contact with a root or heavy stone. Furthermore, the core will positively prevent buckling or springing of the blade when being tempered.

The particular feature of advantage which is possessed by a blade such as shown and described over other blades consisting in part of hard tempered steel and in part of soft untempered metal lies in the extension of the hard envelop over the edges, point, and a portion of the back of the core. By thus protecting the core uniformity of wear of the front, edges, and point of the blade is secured, and grooving of the edges, which is a common defect in blades made up of laminæ differing in hardness, is completely obviated.

Having thus fully described my invention, what I claim as new, and desire to secure by Letters Patent, is—

1. A blade for agricultural implements, comprising a relatively soft core and an envelop or sheath of hardened metal entirely covering the front and sides but only a portion of the back of the core.

2. A blade for agricultural implements, comprising a relatively soft core and an envelop or sheath of hardened metal entirely covering the front, sides, and one end of the core but only a portion of its back.

3. A blade for agricultural implements, comprising a relatively broad and thin core of soft metal having a tapered point and the corners of its rear side beveled, and a protective envelop or sheath of hard metal extending over the face, edges, beveled corners and point of the core, and lying flush with the rear side thereof.

In testimony that I claim the foregoing as my own I have hereto affixed my signature in the presence of two witnesses.

WILLIAM J. MILES, Jr

Witnesses:
 F. W. FRARY,
 WM. E. COLLINS.